United States Patent Office 3,070,641

Patented Dec. 25, 1962

1

3,070,641
BUTADIENE PURIFICATION

John W. Herndon, Pasadena, and Lester M. Welch, Seabrook, Tex., assignors to Petro-Tex Chemical Corporation, Houston, Tex., a corporation of Delaware No Drawing. Filed May 19, 1958, Ser. No. 735,978
3 Claims. (Cl. 260—681.5)

This invention relates to a method for separating vinyl acetylene from butadiene and relates more particularly to an improved method for the preparation of high purity butadiene containing minimum amounts of vinyl acetylene by a novel process involving treating a butadiene-containing $C_4$ hydrocarbon side stream from a final fractional distillation zone employed to provide high purity butadiene with a sodium dispersion to remove vinyl acetylene therefrom.

Butadiene is prepared commercially by dehydrogenating butane or butylenes. The dehydrogenation products contain other hydrocarbons in addition to butadiene. To obtain high purity butadiene, the dehydrogenated product is normally fractionated to concentrate the butadiene and the resulting product is either passed through a cuprous ammonium acetate solution wherein the butadiene is dissolved or is treated by extractive distillation with a solvent such as furfural which dissolves butadiene, and the butadiene is then desorbed from these media. In most commercial processes, particularly when extractive distillation is employed, the desorbed material is fractionally distilled as a final step to produce the desired high purity butadiene. Butadiene which is purified by extractive distillation as with furfural and a final fractionation, normally contains vinyl acetylene as an impurity in the final high purity product. It has been quite difficult, on a commercial scale, to produce high purity butadiene without carrying objectionable quantities of vinyl acetylene along with the butadiene. Many processes for reducing the vinyl acetylene content of high purity butadiene have been proposed, but they are generally complex, often employing catalyzed reactions to remove vinyl acetylene, require handling large volumes of materials and in many of the proposed processes, butadiene losses are excessive. Generally, the proposed processes have not been completely satisfactory in accomplishing the desired result; that is, provision of butadiene containing minimum amounts of vinyl acetylene.

It is well known that vinyl acetylene is an objectionable impurity in butadiene, particularly when the butadiene is to be used in polymerization processes to make synthetic rubbers, such as copolymers of butadiene and styrene, and butadiene and acrylonitrile. Further, it is the practice in the synthetic rubber industry to conduct the reaction of butadiene and styrene to less than complete conversion, often to only 60%, of monomers to polymer, and in such cases, it is economically essential that the unreacted butadiene be recovered and recycled in the polymerization processes. When the butadiene initially employed contains more than a trace of vinyl acetylene, the vinyl acetylene in the recycled butadiene builds up quite rapidly with subsequent additional and accelerated deleterious effects on the polymerization reactions and products.

Accordingly, it is an object of this invention to provide an improved economical process for preparing high purity butadiene containing minimum amounts of vinyl acetylene with a minimum loss of butadiene. Another object is to provide a novel process for removing vinyl acetylene from butadiene. Other objects and advantages of the invention will be apparent from the description thereof which follows.

As pointed out above, complete removal of vinyl acetylene from butadiene-containing streams is particularly difficult in the case of butadiene-containing streams purified

2 by fractional distillation, extractive distillation and a final fractionation to obtain high purity butadiene. Even under the best operating conditions, often more than one-tenth percent vinyl acetylene will be found in the final high purity butadiene product which normally will have a purity of greater than 98.5%. Specifications for polymerization grade butadiene include a limitation of 0.1% by weight maximum of vinyl acetylene as a compromise between requirements of the user and economical and practical purification operations by the producer. Butadiene containing only a few parts per million vinyl acetylene is particularly desirable.

This invention now provides a novel, efficient and inexpensive method for reducing the vinyl acetylene content of polymerization grade butadiene to only a few parts per million or less. This reduction in vinyl acetylene content is readily accomplished by continuous contact of a side stream from the final fractional distillation zone employed to provide high purity butadiene of a portion of the material in the column having vinyl acetylenes concentrated therein with a dilute dispersion of sodium, and return of the treated side stream to the fractional distillation zone.

In the final fractional distillation of butadiene-containing streams, the vinyl acetylenes have a tendency to concentrate in the lower portion of the distillation zone or column. We have now found that when a side stream is taken from this zone at a point in the zone or column below which the concentration of vinyl acetylenes begin to increase, and this side stream is treated with a hereinafter defined sodium dispersion, and the overhead containing less vinyl acetylene than the feed side stream is returned to the fractional distillation column, that butadiene of high purity and with only traces, a few parts per million of acetylene, will be found in the final high purity butadiene product from the fractional distillation column.

In the practice of the invention, a point is established in the fractional distillation zone or column at which the concentration of vinyl acetylene begins to increase and the point of take off for the butadiene-containing side stream containing higher concentrations of vinyl acetylene usually will be below this point. This may be considered as the vinyl acetylene zone. In the usual operations, the vinyl acetylene concentration will be from 3 to 8% on the column tray of highest concentration, but may go as high as 25%. It will be understood, of course, that in the practice of this invention, once the side stream of butadiene containing high concentrations of vinyl acetylene is being withdrawn from the fractionation zone and treated, that the concentration of vinyl acetylenes will be decreased throughout the fractional distillation column and more markedly in the lower third of the column. Actual operating conditions, of course, will dictate, to some extent, the point at which the side stream will be drawn off, and this point can be readily established by the man skilled in the art, both by practice and calculation. The butadiene overhead from the vinyl acetylene removal column normally will be returned to the fractional distillation column, preferably close to the withdrawal point and preferably, but not necessarily in the same physical condition as withdrawn; i.e., if the hydrocarbon is withdrawn as a gas, it should be returned as a gas, so as to effect little change in operating and equilibrium conditions in the column.

The reaction zone for treating the hydrocarbon side stream with sodium dispersion may be any type reactor equipped for continuous or intermittent liquid-liquid or of the gas-liquid contact. Preferably a column or tower, for continuous countercurrent flow of gas and sodium dispersion, of the type known to those skilled in the art such as those useful in extractive distillation processes will be employed. Such columns may include trays or packing, and the like. The size of the column, of course, will depend upon the flow rates required and the degree of vinyl acetylene removal desired or required and this, too, can be readily calculated.

In the normal practice of this invention, the butadiene-containing $C_4$ hydrocarbon side stream drawn from the fractional distillation zone in gaseous form is passed upwardly through a column or tower containing finely divided dispersed sodium suspended in an inert medium flowing downwardly at a temperature below about 50° C. An advantage realized in following the novel process of this invention is that only a small fraction of the total hydrocarbon being fractionally distilled is required to be treated to reduce the vinyl acetylene content of the final butadiene product, and a more valuable advantage is that in the preferred embodiments of the defined process the butadiene loss by polymerization is less than 1%. Another advantage of the novel process of this invention is that polymerization inhibitors such as t-butyl catechol are not required to prevent polymerization of butadiene in the reaction zone.

The treatment of the side stream with the sodium dispersion may be carried out conveniently in a continuous manner or by passing the gaseous hydrocarbon mixture upward through a column containing an inert liquid medium and adding the sodium dispersion at a controlled rate at the top of the column to flow downwardly, as will be described more fully hereinafter. The acetylene-free hydrocarbon or, if desired or required, the hydrocarbon stream containing a reduced vinyl acetylene content, is drawn off at or near the top of the column and is fed back into the fractional distillation column. The spent sodium in the form of sodium acetylide is withdrawn from the bottom of the vinyl acetylene tower and discarded or recovered as desired.

The advantages of this invention are realized only when sodium dispersions containing finely divided sodium of an average particle size in the range from about 1 to about 50 microns in diameter and, more preferably, in the range of about 5 to about 15 microns in diameter, in a concentration in an inert medium of normally from about 0.001 gram sodium per ml. of dispersion to about 0.1 gram sodium per ml. are employed. More preferably, the concentration of sodium in the dispersion is in the range of about 0.1% to about 5% and a particularly useful concentration is about 0.01 gram per ml. of medium; that is, a concentration of sodium in the inert medium of about 1%.

The amount of sodium employed in relation to the hydrocarbon feed stream will be determined on an equivalent molar flow rate of sodium to the vinylacetylene content of the side draw feed stream. In theory one mole of sodium will react with one mole of vinyl acetylene. Excellent results are obtained when a ratio of from about ½ to one molar equivalent of sodium to one molar amount of vinyl acetylene interacting in the column or reaction zone are employed. These ratios may be varied from about 0.05 to about one mole of sodium to one mole of vinyl acetylene, and an excess of sodium over the amount of vinyl acetylene may be employed but, generally, use of an excess is not necessary. It will be understood, of course, that the process of the invention is effective and useful so long as the vinyl acetylene content of the side stream from the final fractional distillation column is reduced and very small amounts of sodium in dispersion in relation to the vinyl acetylene in the side stream will accomplish this. Reduction of the vinyl acetylene content of the side stream of at least 10% is normally desired and complete removal of vinyl acetylene is readily accomplished. Also, sodium is expensive and in view of the potential loss of butadiene by sodium activated polymerization, the amount of sodium employed to react with the vinyl acetylene is preferably kept at a low figure ranging from about one-tenth mole equivalent of sodium to one mole of vinyl acetylene, to less than about one mole of sodium (i.e. about 0.9) equivalent to one mole of vinyl acetylene. The flow rates of sodium dispersion in the defined concentrations and side draw hydrocarbon stream containing vinyl acetylene are readily adjusted to meet these requirements.

It has been found quite unexpectedly that with continuous flow countercurrent systems and the defined small particle size sodium in dilute dispersions, that the efficiency of the sodium in removing vinyl acetylene is unexpectedly great and, in some cases, 200 or more percent efficiencies have been obtained. Optimum results are ordinarily obtained when an amount of sodium employed to react with the vinyl acetylene under the conditions of this invention is normally less than a calculated equivalent amount. By means of this invention, not only is the reaction between vinyl acetylene and sodium more readily controlled with complete utilization of sodium, but a minimum of butadiene polymerization is obtained. This seems to be the result of the novel combination of steps and features in this invention and is quite unexpected and contrary to the teachings of the prior art. When larger sodium particles are employed, that is, sodium sand, which has an average particle size in the range of about one millimeter, these particles are more difficult to handle, become coated with polymer and lose efficiency, and are not otherwise completely satisfactory. Those skilled in the art would have anticipated that when sodium of finer particle size was employed, that a greater rate of polymerization of butadiene to polybutadiene would have been obtained.

It is apparent that the more dilute sodium dispersions will require handling larger volumes of sodium dispersion. In some instances this will be desirable, and under other circumstances, less desirable, depending on operating conditions. In such latter case, the concentration of sodium in the dispersion can be readily increased as defined. It will also be understood that during operation of this process, the vinyl acetylene content of both the fractional distillation column and the hydrocarbon side stream may vary. An adequate analysis will determine this and under such conditions, the flow rate of both the side stream and the sodium dispersion, and the concentration of the sodium dispersion may be suitably altered to effectively reduce the vinyl acetylene content of the side stream most efficiently and economically.

The sodium dispersions are readily prepared by those skilled in the art by a variety of procedures, and the method employed is not believed to be critical so long as the desired particle size sodium is obtained in dispersion. Freshly made dispersions are generally preferred for use in accordance with this invention.

The medium employed for the sodium dispersion may be any inert organic liquid but more preferably is a hydrocarbon such as isooctane, toluene, petroleum ether, octane, xylene, kerosene, and the like. The most useful liquids have a boiling point above the melting point of sodium. A valuable additive to the dispersions, and as an aid in making useful dispersions, are the dispersing agents normally used in preparing sodium dispersions, such as oleic acid, aluminum tristearate, lecithin, and the like, in concentrations from about 0.25 to about one weight percent. In the actual preparation of the dispersion, the most successful devices employ high velocity tangential shear to disperse the sodium in the inert medium. Violent shearing action can be achieved with rotating impellors of various kinds, or by pumping the liquid rapidly through an orifice. This operation is normally performed at a temperature in the range of about 100° C. to 115° C., above the melting point of sodium but below the boiling point of the inert medium. The dispersions are usually made in a closed vessel under a dry nitrogen atmosphere. Sodium may be charged into the medium in metallic form and then melted by heat, and it can also be charged in molten form. The dispersing aid, which normally is oleic acid at a concentration of about 0.25% to about one percent, is usually mixed with the medium but can be added during the operation. Five to twenty minutes of shear producing agitation will usually yield 10 to 15 micron particle sizes. The dispersion is then allowed to cool without agitation under nitrogen. The resulting dispersions normally contain sodium of 10 to 15 micron particle sizes at a concentration of 35 to 50%. The dispersions are diluted as desired or required with the same or other miscible inert liquids.

In a production operation, a $C_4$ hydrocarbon stream obtained by dehydrogenating butylenes is first fractionally distilled to provide a mixture consisting essentially of isobutylene, butene-1, butadiene-1,3, n-butane, trans-2-butene, cis-2-butene and vinyl acetylene. This mixture is subjected to extractive distillation using furfural containing 7% water as the solvent. Essentially all of the butadiene, and vinyl acetylene, and some of the 2-butenes are absorbed in the furfural and the remainder of the $C_4$'s are removed as overhead. The fat solvent is stripped and the overhead of butadiene-1,3, 2-butenes and vinyl acetylene is fed to a fractionating column, and butadiene with a purity of greater than 98% distills overhead and is collected. The vinyl acetylene behaves in this system as though it had a boiling point intermediate between butadiene and trans-2-butene and is split between the overhead and bottoms products in the final fractional distillation column. It has already been pointed out that the vinyl acetylene in the fractional distillation column concentrates usually on the trays below the center of the column and in the practcie of this invention, a small side stream is withdrawn from the column within this region of high concentration of vinyl acetylene. The side stream product is fed counter-current in a small tower to the downwardly flowing sodium dispersion, and the overhead product, which is butadiene and 2-butene with reduced vinyl acetylene content, is returned to the fractional distillation column. By means of this removal of vinyl acetylenes from the fractional distillation column, the overhead product therefrom, which is the high purity butadiene, has only minute traces of vinyl acetylene as an impurity, usually less than about 0.01% under good operating conditions.

It will be recognized that in different size and style fractional distillation columns, and under varying operating conditions in similar columns, that the point of maximum concentration of vinyl acetylene may vary from time to time in the lower portion of the fractional distillation column. It is contemplated and understood that the man skilled in the art will draw off the feed stream for the vinyl acetylene removal at some point from the fractional distillation column in the region where vinyl acetylenes are concentrated. Of course, optimum operating conditions will be obtained when the side stream draw off is at the point in the fractional distillation column where the vinyl acetylene content of the material in the column is greatest. It will be evident, of course, that draw off points outside this optimum concentration within the range of reasonable operating conditions will also be efficient in obtaining the desired results. Ordinarily, although experiment or calculation on a specific column will establish the point of optimum concentration of vinyl acetylenes for most efficient removal, under normal conditions in a 150 tray fractional distillation column, a draw off point between about the 105th and 125th trays or the equivalent thereof in smaller columns will be found to be very satisfactory. Further, any point in the lower third of the column may be used if decreased efficiencies can be tolerated, and in any case the vinyl acetylene concentration in the column will be reduced. Such a point normally will be where the vinyl acetylene content is greater than about 0.1%.

The following examples illustrate representative embodiments of the invention.

*Example 1*

To demonstrate the efficiency of the present invention, a ¾ inch diameter, 5 foot column, was packed to a height of 4 feet with ⅛ inch glass helices. The column was filled with xylene saturated with a hydrocarbon mixture containing 31.61 mole percent butene-2, 64.34 mole percent butadiene and 3.86 mole percent vinyl acetylene. The height of the liquid in the column was maintained at the packing top level by means of a simple mercury regulator attached to the outlet at the bottom of the column. A hydrocarbon stream from the 115th tray of a 150 tray final butadiene fractional distillation column was fed into the bottom of this packed column. This feed stream had the same composition as the material described above used to saturate the xylene for the start up. A sodium dispersion containing sodium from 1 to 15 micron in particle size in xylene of a concentration of 1% in xylene was added to the column from the top. The treated hydrocarbon mixture was drawn off near the top of the column and the spent sodium dispersion as sodium acetylide was drawn off the bottom of the column. The hydrocarbon mixture was passed into the bottom of the column as described, at a rate of 28 liters per hour countercurrent to sodium dispersion added at a rate of 0.0625 mole of sodium per hour, and the reaction was conducted at room temperature. The rate of hydrocarbon flow expressed as moles of vinyl acetylene per hour was 0.0424, the rate of sodium addition expressed as moles of sodium per hour was 0.0652, the percent sodium utilization was 126.5 and the percent acetylene removed was 100. At the end of fifty minutes' running time, the butadiene in the effluent was 64.31 mole percent and the vinyl acetylene content was 0.00 mole percent. In another similar run where the rate of hydrocarbon flow was increased to 0.0495 mole of vinyl acetylene per hour and the sodium flow rate was as above, the sodium efficiency was 146% with 100% vinyl acetylene removal.

*Example 2*

A reaction column 5 feet 8 inches tall and ¾ inch in diameter was employed in this example and a total of 200 ml. of a sodium dispersion containing one gram of sodium, of particle size less than 25 microns, per 100 ml. of xylene was added to the column over a two-hour period. In the first ten minutes, 50 ml. or 0.5 gram of sodium was added. Thereafter, at two to five minute intervals, increments of 2 to 4 ml. of dispersion were added. 352 grams of a hydrocarbon mixture containing 25.49 mole percent butene-2, 71.55 mole percent butadiene and 2.88 mole percent vinyl acetylene, in gaseous state, was passed upward through the column countercurrent to the downwardly flowing sodium dispersion. The flow rates in terms of moles of (1) vinyl acetylene per hour was 0.046, and (2) moles of sodium per hour 0.0435. After 160 minutes running time at room temperature, the vinyl acetylene content of the effluent was zero and the butadiene content of the overhead product was 72.44 mole percent.

*Example 3*

A 4 foot column containing 34 inches of 6 to 12 mesh acid-proof ceramic tile was filled with xylene which was saturated with 40 grams (0.734 mole) of a hydrocarbon mixture containing 25.55 mole percent butene-2, 71.31 mole percent butadiene and 3.08 mole percent vinyl acetylene. A total of 372 grams (6.82 moles) of the hydrocarbon described above was passed as a gas upwardly through the column. Sodium dispersion in xylene, of an average particle size of about 5 to 10 microns, was added to the top of the column in a concentration of 0.11 gram per ml. A total of 30 ml. of dispersion containing 0.1434 mole (3.3 grams) of sodium was added. The hydrocarbon flow was at a rate of 0.0555 mole vinyl acetylene per hour and the sodium dispersion flow rate as moles of sodium per hour was 0.0507. After 190 minutes' running time at room temperature, the overhead hydrocarbon effluent from this column had a vinyl acetylene content of zero.

*Example 4*

A 5 foot 8 inch column was packed with ⅛ inch glass helices. A total of 11.1 moles (606 grams) of a hydrocarbon feed containing 18.92 mol percent butene-2, 80.73 mole percent butadiene and 0.1 mole percent vinyl acetylene was passed through this column countercurrently to a downwardly flowing sodium dispersion. 100 ml. of sodium dispersion in xylene in a concentration of 0.002 gram per ml. was added initially, 30 ml. were added additionally over a 30-minute period, and then a sodium dispersion of a concentration of 0.004 gram per ml. was added to the column over the next three hours at a rate of 233 ml. per hour. The flow rate as moles of vinyl acetylene per hour was 0.00312, and sodium, 0.00397. The vinyl acetylene content of the hydrocarbon effluent during and at the end of 5½ hours was 0.00%.

This example was repeated with a sodium dispersion of 0.006 gram sodium per ml. of xylene. 8.72 moles of the same hydrocarbon were fed to the column at a flow rate of moles of vinyl acetylenes of 0.00234 and sodium of 0.00305. At the end of both 60 and 265 minutes' running time the vinyl acetylene content of the effluent was 0.00%.

The example was repeated with a rate of hydrocarbon flow as vinyl acetylene of 0.0460, rate of sodium addition of 0.0435 and, in this case, 94.5% of the butadiene was recovered. The sodium utilization was 200% and the vinyl acetylene removed was 100% so that the effluent was free of vinyl acetylenes.

In another embodiment, washed beach sand was employed as the packing material and at a rate of hydrocarbon flow on moles of vinyl acetylene per hour of 0.00366 and a rate of sodium addition of 0.00366, the butadiene recovery was 97.3%, the sodium utilization was 118% and the percent vinyl acetylenes removed was 100%.

*Example 5*

In a 6½ foot column, packed with glass helices, a hydrocarbon mixture containing 64.82 mole percent butene-2, 27.54 mole percent butadiene and 5.95 mole percent vinyl acetylene was introduced as gas at the base of the column and a freshly prepared sodium dispersion in xylene of a particle size range of 1 to 15 microns was added to the top of the column at the following rates and with the following listed results: the rate of hydrocarbon flow was 36 liters per hour (the rate as vinyl acetylene was 0.0956 mole per hour), and the rate of sodium addition in moles per hour was 0.0690, in a concentration of 0.0795 gram per ml. in xylene. During a 6½ hour run, the vinyl acetylene content of the effluent remained 0.00% and the percent butadiene recovered was greater than 90%.

*Example 6*

Following the procedures outlined above, a hydrocarbon side stream from a fractional distillation column containing 5.65% trans-butene-2, 2.11% cis-butene-2, 90.34% butadiene and 1.89% vinyl acetylene was contacted with a sodium dispersion of average particle size from 5 to 15 microns in a molar ratio of sodium to vinyl acetylene of 0.1 to 1.0. The percent vinyl acetylene removed from the side stream was 16.4 and the treated overhead contained 1.58% vinyl acetylene and 90.76% butadiene. On an efficiency basis, 1.67 moles of vinyl acetylene per mole of sodium was removed. When this example was repeated with a ratio of sodium to vinyl acetylene of 0.5 to 1.0, 73% of the vinyl acetylene was removed from the side stream and the overhead returned to the fractional distillation column contained 0.51% vinyl acetylene and 91.25% butadiene. The overhead butadiene product from the fractional distillation column will have a vinyl acetylene content of less than 0.01% when the vinyl acetylene content in the zone of maximum concentration in the fractional distillation column is kept in this range, 0.5% or less.

In a production scale embodiment of this invention, a stream containing about 78% butadiene, 10% low boiling butene-2, 12.1% high boiling butene-2 and 0.045% vinyl acetylene obtained from a furfural extractive distillation unit, is fed into a 12 foot diameter fractional distillation column containing 150 trays at a flow rate of 250 barrels per hour. The pressure at the top of this column is 80 p.s.i.g., the overhead vapor temperature is 125° F., the reflux temperature is 95° F., the hydrocarbon feed temperature is 80° F. and the bottoms temperature is 150° F. The net overhead product from this column is 200 barrels per hour of butadiene having a purity greater than 98.5%. The reflux ratio is varied, as desired. A side stream from the 115th tray of the fractional distillation column is fed to a scrubbing tower 43 feet high, 2½ foot inside diameter tower containing 12 mesh acid proof ceramic tile at a flow rate of 50 barrels per hour. This stream contains 1% vinyl acetylene. The feed stream from the side draw of the fractional distillation column is cooled to about 120° F. The sodium dispersion fed to this column is at a rate of 100 barrels per hour, the sodium being dispersed in xylene in a concentration of 1.25% in a molar ratio of vinyl acetylene to sodium of about 1 to 0.8. The vinyl acetylene content of the vinyl acetylene column overhead return to the fractional distillation column contains about 0.00 mole percent vinyl acetylene. After this system is in operating equilibrium and on a continuous basis, the overhead butadiene product from the fractional distillation column contains less than 0.01 percent vinyl acetylene.

When this process is applied to a side stream containing about 2% vinyl acetylene, the concentration of sodium in xylene, employed at the same flow rates, may be varied from about 2 to 3% to obtain complete removal of vinyl acetylene and at concentrations of about 0.5 to 1.00% to obtain substantial but less than complete removal of vinyl acetylene if desired. In either event, the overhead is returned to the final fractional distillation column and the final high purity butadiene therefrom will contain less than 0.01 percent vinyl acetylene and usually only a few parts per million.

As has been pointed out above, the vinyl acetylene concentrating in the lower portion of the fractional distillation column in operations not employing the improved process of this invention, can reach values as high as 25%. However, when the process of this invention is employed, these high concentrations are not reached, and the vinyl acetylene content of the column is kept at a low figure. It is possible, therefore, to operate the vinyl acetylene solvent column, both intermittently and on a continuous basis, as desired or required. Normally, better results are obtained, of course, when continuous operations are employed and smaller equipment and lesser volume feed streams of sodium dispersion and side stream from the fractional distillation column may be employed with attendant advantages in lower equipment investment and ease of operations. As is apparent, operating conditions can be varied readily by those skilled in the art to meet the requirements of purity and material balance as desired and/or required.

Under operating conditions such that the bottoms product from a fractional distillation column contain appreciable amounts of vinyl acetylene, the bottoms product stream could be fed to a reaction column as described, and the vinyl acetylene removed therefrom. This operation would substantially reduce the vinyl acetylene content of the $C_4$ hydrocarbons in the fractional distillation column if done on a continuous or semi-continuous basis since, with such removal, the distribution of vinyl acetylene in the lower portion of the fractional distillation column would be substantially effected with subsequent lowering of the vinyl acetylene content of the $C_4$ hydrocarbons nearer the top of the fractional distillation column.

The side stream draw may be either a liquid or vapor stream, it being usually advantageous to supply a vapor feed to the vinyl acetylene removal column. The overhead product from the vinyl acetylene reaction zone is fed back into the fractional distillation column as a liquid or vapor stream, preferably vapor. The overhead stream from the vinyl acetylene reaction column being fed back to the fractional distillation tower may contain appreciable quantities of vinyl acetylene so long as the vinyl acetylene column is continuously removing some of the vinyl acetylene from the feed so that the overhead product from the fractional distillation column is at the desired low level.

It has been found that the most efficient use of this invention is made when the system is operating to remove sufficient vinyl acetylene from the side stream in the vinyl acetylene extractive distillation column to maintain a vinyl acetylene content in the zone of maximum vinyl acetylene concentration in the fractional distillation column of less than about 5% and, more preferably, less than 2%. A preferred range of vinyl acetylene content to be maintained in the fractional distillation column at the point of maximum concentration is from about one-half or less to about one and one-half percent vinyl acetylene, and in this range, the vinyl acetylene content of the high purity butadiene in the overhead from the fractional distillation column will be less than 0.1% or will be less than about 0.05%, usually less than 0.01%. When the maximum concentration of vinyl acetylene in the fractional distillation column is maintained at about 1% or less, the vinyl acetylene content of the butadiene overhead will be less than 0.01%. As has been shown before, in continuous operation, so long as some vinyl acetylene is removed from the side stream, preferably greater than about 10% thereof, the advantages of this invention will be obtained. Operating conditions in the vinyl acetylene reaction zone may be established by the man skilled in the art so as to maintain vinyl acetylene in the area of maximum concentration in the fractional distillation zone of less than about one percent so as to obtain end product butadiene containing less than 0.01 percent vinyl acetylene and as low as 10 or less parts per million.

The advantages of this invention are realized by means of a small and inexpensive vinyl acetylene reactor column and relatively low sodium dispersion flow rates to treat a small side stream portion of the total material being fractionated to provide an improved butadiene product containing only a few parts per million or less of vinyl acetylene. The butadiene-containing stream fed to the fractional distillation column normally will contain more than about 25% butadiene but may contain lesser amounts of butadiene. One of the advantages of this invention is that the total butadiene-containing stream is not required to be treated to reduce the vinyl acetylene content of the final high purity butadiene product and normally less than about one-third of the total hydrocarbon feed to the final fractional distillation zone will be withdrawn as a side stream to be treated to remove vinyl acetylene therefrom. This process is readily adapted to other sequences and methods of preparing and purifying butadiene to decrease the vinyl acetylene content of the butadiene. Likewise, the procedure is readily applied to other unsaturated hydrocarbons and in particular, conjugated dienes such as isoprene to reduce the acetylene content thereof.

We claim:

1. The process for the refining of hydrocarbon streams to produce butadiene-1,3 of a concentration of at least 98% butadiene-1,3 and containing less than 0.05% vinyl acetylene comprising the steps of fractionally distilling the hydrocarbon stream in a first fractional distillation column to produce a $C_4$ hydrocarbon mixture consisting essentially of isobutylene, butene-1, butadiene-1,3, n-butane, trans-2-butene, cis-2-butene, and vinyl acetylene; subjecting the said $C_4$ hydrocarbon mixture to extractive distillation whereby essentially all of the butadiene-1,3 and vinyl acetylene and some of the 2-butenes are absorbed in the solvent to product a fat solvent, and whereby the remaining $C_4$'s are removed overhead; stripping the said fat solvent whereby the butadiene-1,3, 2-butenes and vinyl acetylene are taken off as an overhead; feeding said overhead to a second fractional distillation column, withdrawing at a rate less than about one-third the feed rate to said second distillation column a side stream containing a concentration of vinyl acetylene greater than 0.1% and which concentration is higher than the vinyl acetylene content of the hydrocarbon mixture being fractionally distilled, contacting said side stream with a dilute sodium dispersion in an amount from about 0.1 to about 0.9 mol sodium per mol of vinyl acetylene and containing finely divided sodium particles of an average particle size from about 1 to about 50 microns under such conditions that greater than 10% of said vinyl acetylene in the side stream is removed from the hydrocarbon mixture being fractionally distilled, and returning the treated hydrocarbon to said second fractional distillation column, whereby the maximum concentration of vinyl acetylene in the second distillation column is less than about 5%, to produce overhead the said 98% concentration butadiene-1,3 which contains less than 0.05% vinyl acetylene.

2. The process for the refining of hydrocarbon streams to produce butadiene-1,3 of a concentration of at least 98% butadiene-1,3 and containing less than 0.01% vinyl acetylene comprising the steps of fractionally distilling the hydrocarbon stream in a first fractional distillation column to produce a $C_4$ hydrocarbon mixture consisting essentially of isobutylene, butene-1, butadiene-1,3, n-butane, trans-2-butene, cis-2-butene, and vinyl acetylene; subjecting the said $C_4$ hydrocarbon mixture to extractive distillation whereby essentially all of the butadiene-1,3 and vinyl acetylene and some of the 2-butenes are absorbed in the solvent to produce a fat solvent, and whereby the remaining $C_4$'s are removed overhead; stripping the said fat solvent whereby the butadiene-1,3, 2-butenes and vinyl acetylene are taken off as an overhead; feeding said overhead to a second fractional distillation column, withdrawing from the bottom one-third of the column at a rate less than about one-third the feed rate to said second distillation column a side stream containing a concentration of vinyl acetylene greater than 0.1% and which concentration is higher than the vinyl acetylene content of the hydrocarbon mixture being fractionally distilled, contacting said side stream with a dilute sodium dispersion in an amount from about 0.1 to about 0.9 mole sodium per mole of vinyl acetylene and containing finely divided sodium particles of an average particle size from about 5 to 15 microns under such conditions that greater than 10% of said vinyl acetylene in the side stream is removed from the hydrocarbon mixture being fractionally distilled, and returning the treated hydrocarbon to said second fractional distillation column, whereby the maximum concentration of vinyl acetylene in the second distillation column is less than about 1%, to produce overhead the said 98% concentration butadiene-1,3 which contains less than 0.01% vinyl acetylene.

3. The process for the refining of hydrocarbon streams to produce butadiene-1,3 of a concentration of at least 98% butadiene-1,3 and containing less than 0.05% vinyl acetylene comprising the steps of fractionally distilling the hydrocarbon stream in a first fractional distillation column to produce a $C_4$ hydrocarbon mixture consisting essentially of isobutylene, butene-1, butadiene-1,3, n-butane, trans-2-butene, cis-2-butene, and vinyl acetylene; subjecting the said $C_4$ hydrocarbon mixture to extractive distillation whereby essentially all of the butadiene-1,3 and vinyl acetylene and some of the 2-butenes are absorbed in the solvent to produce a fat solvent, and whereby the remaining $C_4$'s are removed overhead; stripping the said fat solvent whereby the butadiene-1,3, 2-butenes and vinyl acetylene are taken off as an overhead; feeding said overhead to a second fractional distillation column, withdrawing at a rate less than about one-third the feed rate to said second distillation column a side stream from a point equivalent to between the 105th and 125th plates of a 150 plate fractional distillation column containing a concentration of vinyl acetylene greater than 0.1% and which concentration is higher than the vinyl acetylene content of the hydrocarbon mixture being fractionally distilled, contacting said side stream with a sodium dispersion of a concentration of about 0.1% to about 5% in an amount from about 0.1 to about 0.9 mole sodium per mole of vinyl acetylene containing finely divided sodium particles of an average particle size from about 1 to about 15 microns under such conditions that greater than 10% of said vinyl acetylene in the side stream is removed from the hydrocarbon mixture being fractionally distilled, and returning the treated hydrocarbon to said second fractional distillation column, whereby the maximum concentration of vinyl acetylene in the second distillation column is maintained at less than about 1%, to produce overhead the said 98% concentration butadiene-1,3 which contains less than .05% vinyl acetylene.

References Cited in the file of this patent

UNITED STATES PATENTS

| | | |
|---|---|---|
| 2,002,902 | Martin et al. | May 28, 1935 |
| 2,373,715 | Soday | Apr. 17, 1945 |
| 2,398,810 | Soday | Apr. 23, 1946 |
| 2,413,256 | Soday | Dec. 24, 1946 |
| 2,415,006 | Hachmuth | Jan. 28, 1947 |
| 2,750,435 | Fetchin | June 12, 1956 |
| 2,886,612 | McIntire | May 12, 1959 |
| 3,000,794 | Tschopp | Sept. 19, 1961 |